(12) United States Patent
Villagomez (10) Patent No.: US 9,269,463 B2
(45) Date of Patent: Feb. 23, 2016

(54) METHOD AND APPARATUS OF INSPECTING THE UPPER CORE SHROUD OF A NUCLEAR REACTOR VESSEL

(75) Inventor: Ramon O. Villagomez, San Antonio, TX (US)

(73) Assignee: IHI Southwest Technologies, Inc., San Antonio, TX (US)

( * ) Notice: Subject to any disclaimer, the term of this patent is extended or adjusted under 35 U.S.C. 154(b) by 1045 days.

(21) Appl. No.: 13/419,942

(22) Filed: Mar. 14, 2012

(65) Prior Publication Data

US 2013/0243144 A1    Sep. 19, 2013

(51) Int. Cl.
    *G21C 17/007*    (2006.01)

(52) U.S. Cl.
    CPC .................. *G21C 17/007* (2013.01)

(58) Field of Classification Search
    CPC .............................. G21C 17/00; G21C 17/007
    USPC ........ 376/249, 134, 143; 901/19; 414/222.01; 73/601, 623
    See application file for complete search history.

(56) References Cited

U.S. PATENT DOCUMENTS

| | | | |
|---|---|---|---|
| 5,586,155 A * | 12/1996 | Erbes et al. | 376/249 |
| 6,332,011 B1 | 12/2001 | Johnson | |
| 6,525,500 B2 * | 2/2003 | Hatley et al. | 318/568.12 |
| 2005/0135904 A1 * | 6/2005 | Wivagg et al. | 414/222.01 |
| 2007/0125190 A1 | 6/2007 | Morris et al. | |
| 2008/0165911 A1 | 7/2008 | Ortega | |
| 2008/0205575 A1 | 8/2008 | Morris et al. | |

OTHER PUBLICATIONS

"Boiling water reactor," http://en.wikipedia.org/wiki/Boiling_water_reactor, pp. 1-21.
"Boiling Water Reactors," NRC, Oct. 1, 2008, http://www.nrc.gov/reactors/bwrs.html, p. 1.
"The Boiling Water Ractor (BWR)," NRC, Feb. 14, 2007, http://www.nrc.gov/reading-rm/basic-ref/students/animated-bwr.html, p. 1.

* cited by examiner

*Primary Examiner* — Jack W Keith
*Assistant Examiner* — Lily Crabtree Garner
(74) *Attorney, Agent, or Firm* — Gunn, Lee & Cave, P.C.

(57) ABSTRACT

A method and apparatus for inspecting the upper portion of a core shroud of a nuclear power plant is provided. The upper shroud scanner mounts on an arcuic section of a steam dam of the core shroud and moves back and forth there along. A vertical arm with transducers thereon extend down from a Y-car portion of the upper shroud scanner. Transducers adjacent the core shroud emit and receive an ultrasonic sound to inspect for flaws and defects in the core shroud.

1 Claim, 6 Drawing Sheets

METHOD AND APPARATUS OF INSPECTING THE UPPER CORE SHROUD OF A NUCLEAR REACTOR VESSEL

BACKGROUND OF THE INVENTION

1. Field of the Invention

The invention relates to a method and apparatus of inspecting welds and, more particularly, inspecting welds in an upper core shroud of a reactor vessel of nuclear power plant.

2. Description of the Prior Art

In a nuclear power plant, the nuclear reaction occurs inside of a reactor containment vessel which further has a reactor vessel therein. Inside of the reactor vessel is located a core shroud in which a nuclear reaction occurs. The inside of the core shroud is subjected to wide variations in temperature and pressure. As a result of the wide variations in temperature and pressure, metal fatigue could occur in the core shroud. To ensure that does not occur, or monitor potential problems if they do occur, there are requirements by the Nuclear Regulatory Commission that the core shroud be periodically inspected, especially any welds in the core shroud.

In the past, various types of inspection devices for inspecting the core shroud have been developed such as is shown in U.S. Pat. No. 5,586,155 to Erbes et al. However, the invention as shown in the Erbes patent has some practical problems. The assembly mounts on the steam dam and is propelled around the steam dam by conical tractor drive wheels. Because of the slippage of the tractor drive wheels, the operator at the top of the reactor containment vessel cannot tell exactly where the sensors are located within the core shroud.

The inspection of the core shroud occurs when the particular reactor of a nuclear power plant is shut down. While that reactor is shut down, the top of the reactor containment vessel is opened, the top of the reactor vessel is opened and the top of the core shroud is opened. Due to the nuclear radiation, the person performing the inspection has to remain at the top of the opened reactor containment vessel. The inspection device must be operated entirely from the top of the reactor containment vessel. Typically at the time the inspection is being made of the core shroud and the welds therein, numerous other activities are occurring in the shut-down unit of the nuclear power plant. Therefore, numerous people performing other functions will be at the open top of the reactor containment vessel. Hence, space at the top of the reactor container vessel is limited.

One of the problems that existed for prior inspection methods of a core shroud is that they required a ring to be mounted all the way around the top of the core shroud, typically on the steam dam. This meant a lot of room had to be taken at the top of the reactor containment vessel during the period of shut down, which is when other people are needing space to perform their functions. Also, the shroud at the steam dam was not perfectly circular and many times the rings would not fit on the steam dam.

In addition to the Erbes patent described herein above, other patents have been published and/or issued on various tools that can be used to inspect core shrouds from the top of the containment vessel. Such patents or patent applications include Johnson (U.S. Pat. No. 6,332,011), Ortega (U.S. Patent Publication No. US 2008/0165911), Morris (U.S. Patent Publication No. US 2007/0125190) and Morris (U.S. Patent Publication No. US 2008/0205575). Each of these patents show various types of ways of inspecting core shrouds located within a reactor vessel of a reactor containment vessel.

SUMMARY OF THE INVENTION

It is an object of the present invention to provide an apparatus to inspect the upper welds on a core shroud of a nuclear power plant.

It is another object of the present invention to provide an apparatus for inspecting the upper core shroud of a unit in a nuclear power plant, when the unit is shut down, the reactor containment vessel opened along with the reactor vessel to allow access to the top of the core shroud.

It is another object of the present invention to provide an arcuic section of a rail that connects to the steam dam at the top of a core shroud, which rail has mounted thereto transducers for inspecting weld joints in an upper core shroud.

When a unit of a nuclear power plant is shut down, the reactor containment vessel and the reactor vessel opened, access can be obtained to the core shroud. At that time, an arcuic rail making approximately a 30° arc is lowered into and clamped on the steam dam at the top of the core shroud. A Y-car is attached to the arcuic rail and is driven along the arcuic rail by gears with a gear rack on the arcuic rail. As the Y-car moves back and forth, transducers attached thereto inspect a series of welds on the core shroud. A vertical arm extends downward to inspect lower welds within the core shroud. Air cylinders are used to position the transducers adjacent to the welds being inspected and to move the vertical arm in and out of contact with the core shroud. The bottom transducer arm may be pivoted in and out of contact with a lower weld on the core shroud.

Because the arcuic rail is a fairly short arc, i.e., of approximately 30°, not that much space at the top of the reactor containment vessel is needed during inspection. After the arcuic section of the core shroud of approximately 30° is inspected, clamps on either end of the rail are loosened from the steam dam. Simultaneously a lug clamp clamps to one of the lugs on the outside of the core shroud. By turning the gear that meshes with the gear rack, the entire arcuic rail is moved around the steam dam to the next 30° section of the core shroud.

During the inspection of a section of the core shroud, different transducers may be operated at different times, each of which would be inspecting a weld or an area around a weld.

After the next section of the core shroud is inspected, the lug clamp is loosened from its prior core shroud lug and moved around the arcuic rail so that it now clamps to a new core shroud lug that is at the opposite end of the arcuic rail. Then, rail clamps are loosened and the gear motor that turns the gear meshing with gear rack is again turned which slides the arcuic rail around the steam dam to inspect another section of the core shroud. Clamps are again clamped so that the arcuic rail securely attaches itself to the steam dam and the inspection process repeated.

DESCRIPTION OF THE PREFERRED EMBODIMENT

Figure 1:
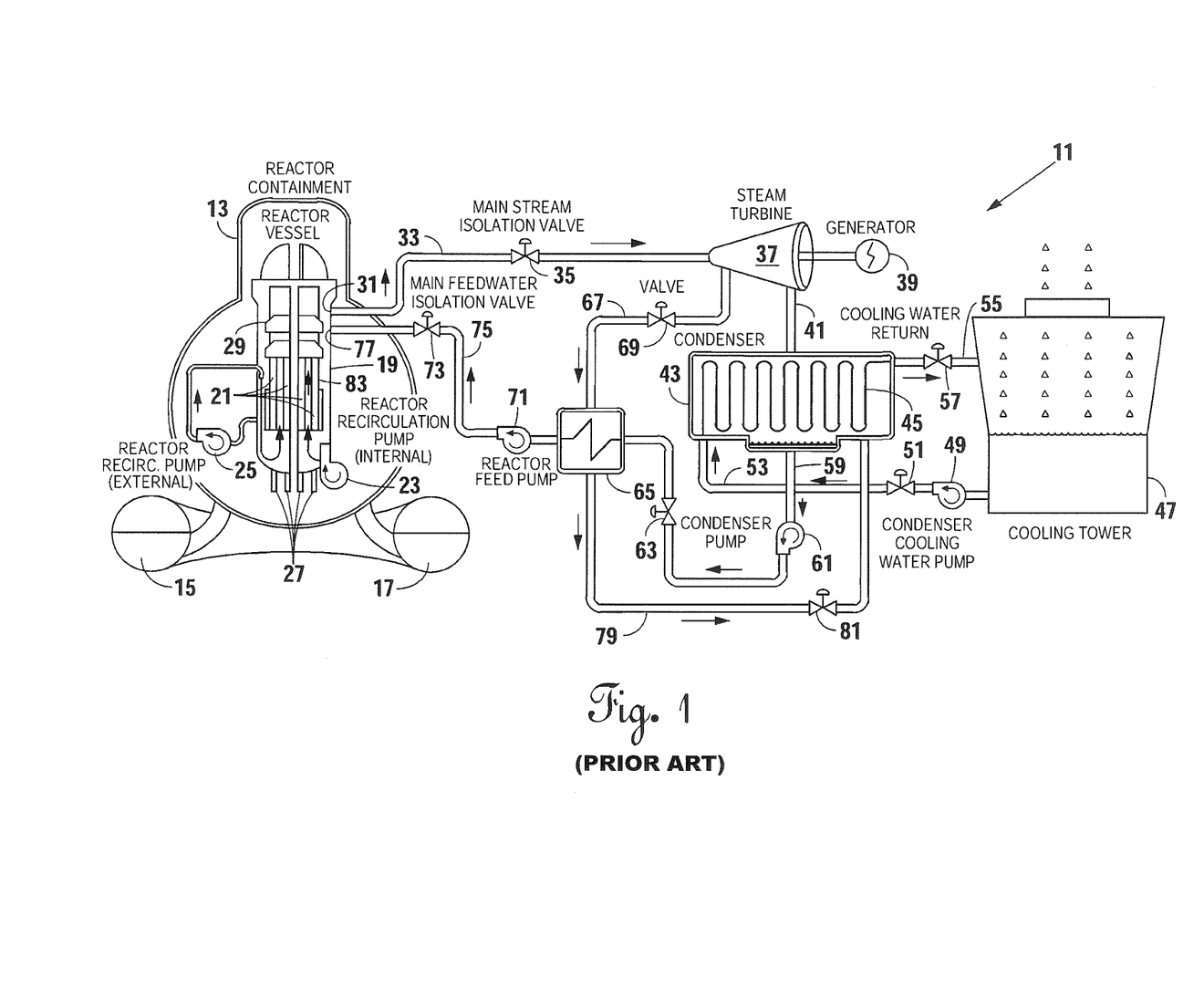
FIG. 1 is a pictorial flow diagram of the operation of a nuclear power plant.

An illustrative flow diagram for a nuclear power plant for generating electricity is shown in FIG. 1 and is represented generally by reference numeral 11. The nuclear power plant 11 has a reactor containment vessel 13 that has a torus 15 with an auxiliary water feed 17, which is a backup water supply for the nuclear power plant 11.

Inside of the reactor containment vessel 13 is located a reactor pressure vessel 19. A bundle of fuel rods 21 absorb a neutron to cause nuclear fission and releases of other neutrons. The nuclear fission heats the water contained within reactor pressure vessel 19 to convert the water to steam.

To ensure the bundle of fuel rods 21 remain immersed in water an internal reactor recirculation pump 23 continues to recirculate water over the bundle of fuel rods 21. Also, an external reactor recirculation pump 25 circulates water within the reactor pressure vessel 19 to ensure the bundle of fuel rods 21 remain cool and immersed in the water.

Inside the reactor pressure vessel 19 different fluids have been used, including gas, liquid metal or molten salts to ensure that the nuclear reaction does not run away. Control rods 27 are located in the bottom of the reactor pressure vessel 19. The control rods 27 absorb some of the released neutrons to prevent too large of a nuclear reaction with the bundle of fuel rods 21.

Above the bundle of fuel rods 21 is located heat exchanger 29, which is used to convert the water to steam. Steam generated in the reactor pressure vessel 19 enters steam line 33 through outlet nozzle 31. The steam flows through the steam line 33 and the main steam isolation valve 35 to enter steam turbine 37. As the steam turns the steam turbine 37, steam turbine 37 turns generator 39, which generates electricity.

After the steam flows through the steam turbine 37, a major portion of the steam flows through the main steam exit conduit 41 to condenser 43. Circulating through the condenser coil 45 is cooling water received from the cooling tower 47 via condenser cooling water pump 49, cooling water control valve 51 and cooling water inlet conduit 53. The cooling water returns to the cooling tower 47 via cooling water return conduit 55 and cooling water return valve 57. The cooling water can be of any convenient source such as lake water or river water. The cooling water does not have to be refined or processed.

From condenser 43 through the feed water return conduit 59, the water is being pumped by condenser pump 61 through water return valve 63 into a feed water heater/preheater 65. The feed water flowing back to the reactor pressure vessel 19 is heated/preheated inside of feed water heater/preheater 65 which receives some of the steam flowing through steam turbine 37 through preheater steam conduit 67 and control valve 69 to feed through water heater/preheater 65. The feed water heater/preheater 65 increases the temperature of the feed water significantly prior to returning to the reactor pressure vessel 19 via reactor feed pump 71, main feed water isolation valve 73 and main feed water return conduit 75. The main feed water is discharged into the reactor pressure vessel 19 through return nozzle 77.

Any remaining portion of the preheater steam received in the feed water heater/preheater 65 flows to condenser 43 through preheater steam conduit 79 and preheater steam control valve 81.

Figure 2:
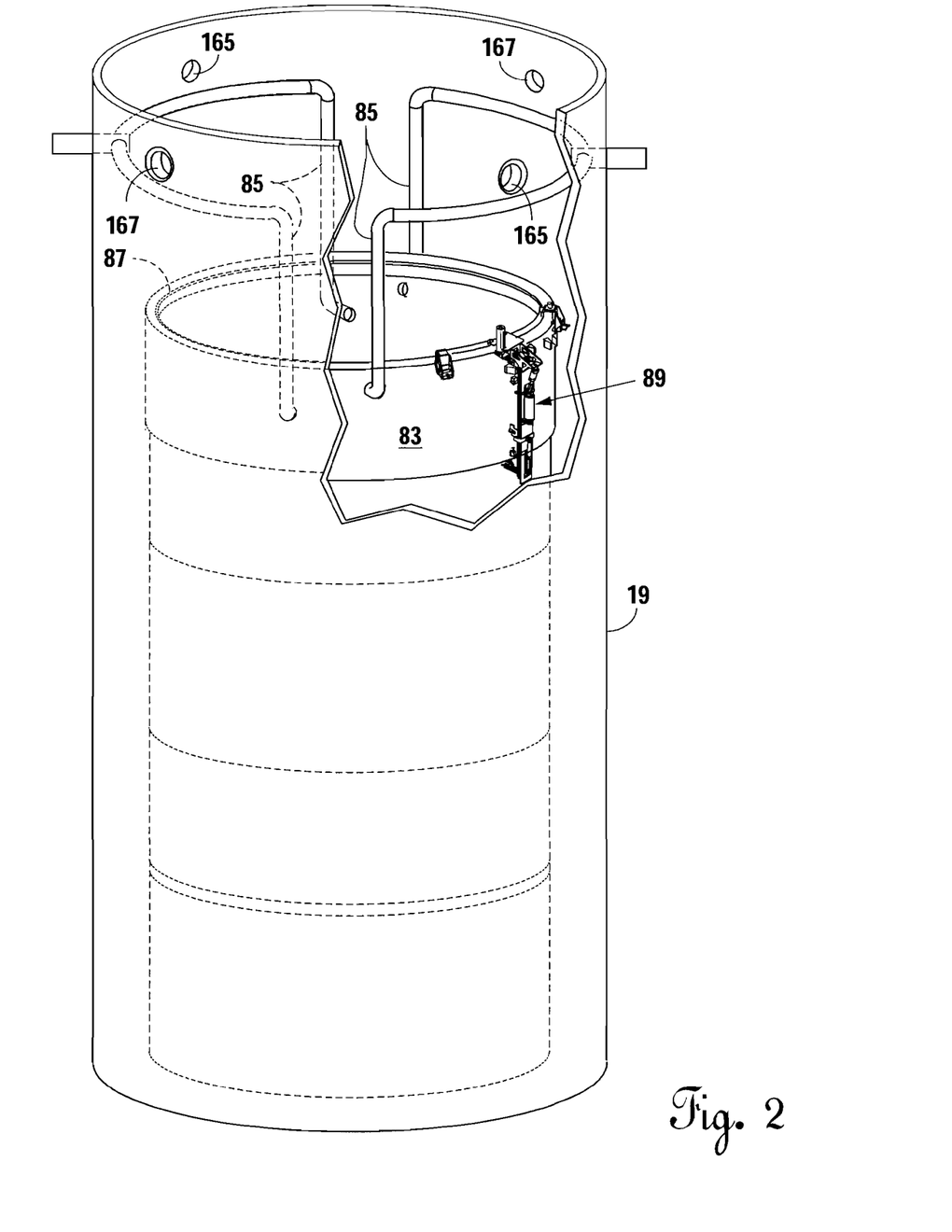
FIG. 2 is a partial section pictorial view of a reactor vessel with a core shroud being shown therein with an upper shroud scanner located thereon.

Inside of the reactor pressure vessel 19 is a core shroud 83 where a bundle of fuel rods 21 are located. The nuclear reaction occurs inside of the core shroud 83. In FIG. 2, a perspective view of the reactor pressure vessel 19 and the core shroud 83 are shown. Connecting between the reactor pressure vessel 19 and the upper portion of the core shroud 83 are a series of downward extending pipes called down corners 85. The down corners 85 have a tendency to interfere with devices that may be used to inspect core shroud 83 for defects or flaws.

Figure 3:
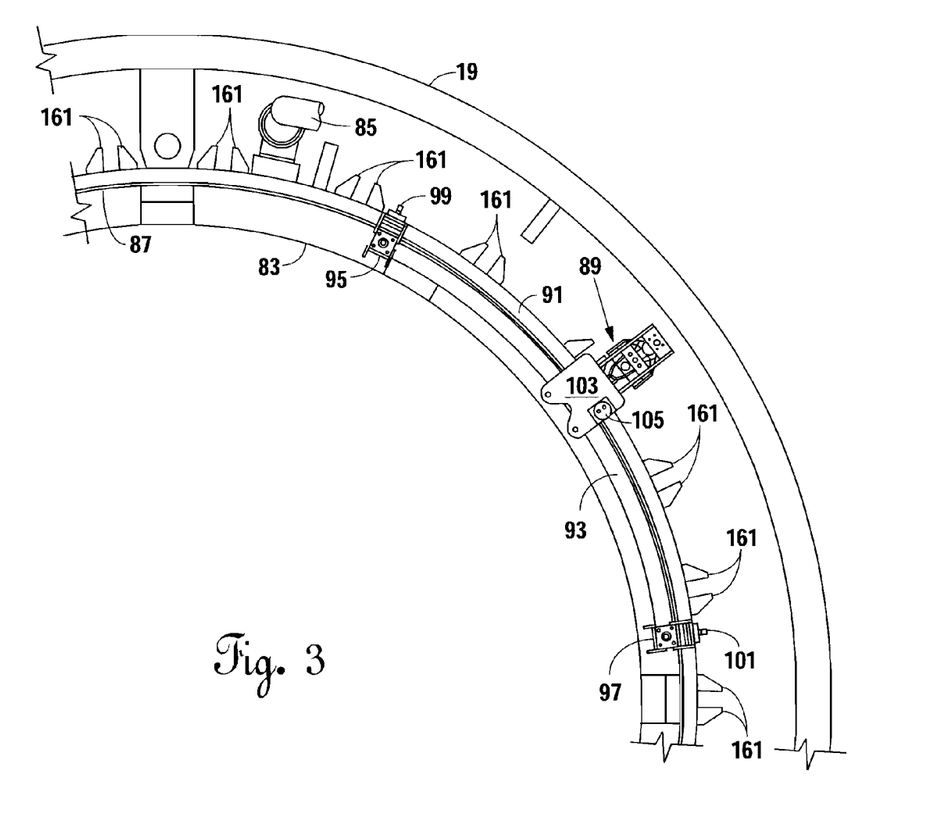
FIG. 3 is a partial top view of a reactor vessel and core shroud when the reactor containment vessel is opened with the upper shroud scanner being located therein and attached to the steam dam.

Referring to FIGS. 2 and 3 in combination, a steam dam 87 is located on the top of the core shroud 83. The steam dam 87 is a flange that extends upward about two or three inches above the top of the core shroud 83. Mounted on the top of core shroud 83, attached to the steam dam 87 and extending downward outside of the core shroud 83 is an upper shroud scanner 89. The upper shroud scanner 89 has an outside flange 91 and an inside flange 93 clamped to the steam dam 87 by clamps 95 and 97. Each of the clamps 95 and 97 is operated by air cylinder 99 and 101, respectively. Mounted on the outside flange 91 and inside flange 93, which are both clamped to the steam dam 87, is a Y-car 103 that is driven by Y-car motor 105.

Figure 4:
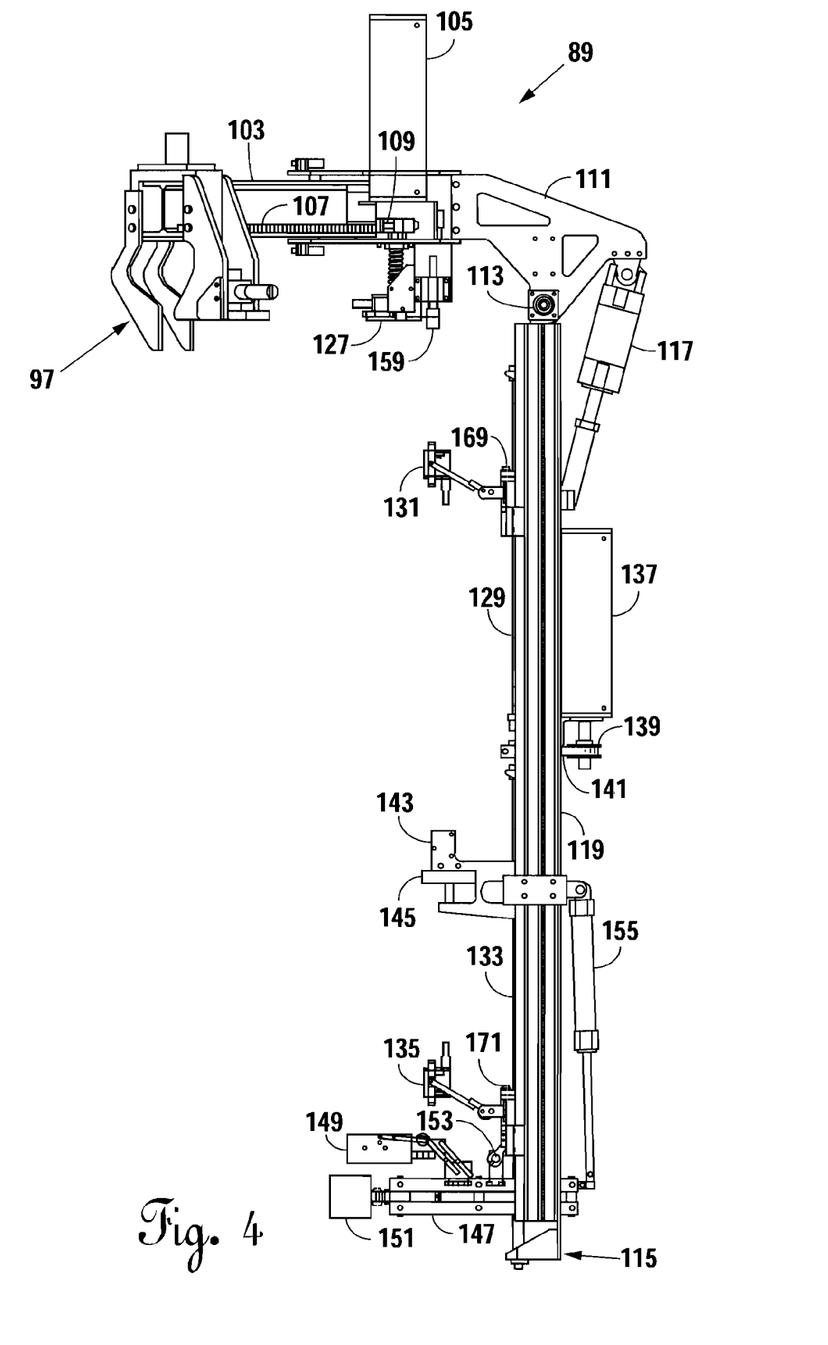
FIG. 4 is a side view of the upper shroud scanner.
Figure 5:
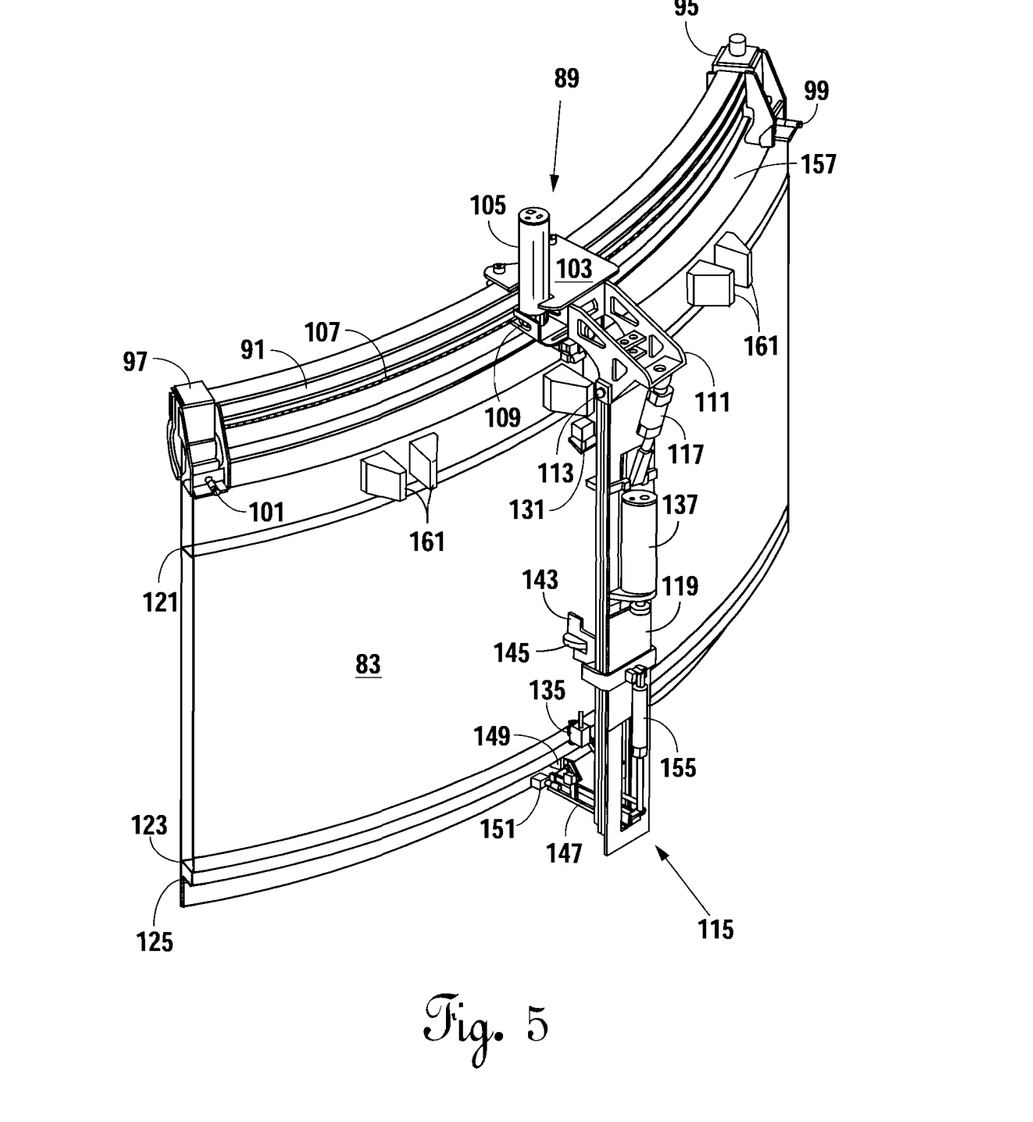
FIG. 5 is a pictorial view of the upper shroud scanner being mounted on a section of the steam dam of the core shroud.

Referring to FIGS. 4 and 5 in combination, the upper shroud scanner 89 will be explained in more detail. A gear rack 107 is located on the outside flange 91, which is clamped to the steam dam 87 (see FIG. 3). Y-car motor 105 drives gear 109 that meshes with the gear teeth in gear rack 107. For the turning of gear 109, the entire upper shroud scanner 89 may be moved left or right on the outside flange 91 and inside flange 93, which are clamped to the steam dam 87.

The Y-car 103 has a pivot arm base 111 extending outwardly therefrom. Extending downward from the pivot arm base 111 on pivot pin 113 is vertical arm 115. Vertical arm 115 may be pivoted about pivot pin 113 by air cylinder 117. The vertical arm 115 has a mounting plate 119 extending downward from pivot pin 113 to which everything is attached. The upper shroud scanner 89 is used to inspect an upper weld 121, middle weld 123 and lower weld 125 in the upper portion of the core shroud 83. Transducers will be used to inspect above and below each of the welds 121, 123 and 125.

Mounted on the Y-car 103 below the Y-car motor 105 is upper transducer 127. Mounted on an upper lead screw 129 is upper moveable transducer 131. Mounted on a lower lead screw 133 is a lower moveable transducer 135. A transducer motor 137 turns pulley 139, which operates belt 141. The turning of belt 141 turns upper lead screw 129 and/or lower lead screw 133 to adjust upper moveable transducer 131 or lower moveable transducer 135 either up or down. Upper moveable transducer 131 should be adjusted until its positioned at or just below upper weld 121. The lower moveable transducer 135 should be adjusted until it is adjacent or just above middle weld 123.

Mounted on roller bracket 143, which is attached to mounting plate 119, is roller 145. The roller 145 sets the distance between the vertical mounting plate 119 and the core shroud 83 and allows for ease and movement of the entire upper shroud scanner 89 around the core shroud 83.

Mounted on a bottom transducer arm 147 are upper bottom transducer 149 and lower bottom transducer 151. The upper bottom transducer 149 is used to check below middle weld 123 and above lower weld 125. Lower bottom transducer 151 is used to check below weld 125. The entire bottom transducer arm is pivotally connected around pivot pin 153. The bottom transducer arm 147 may be pivoted out of the way by actuation of air cylinder 155 connected between the outside of roller bracket 143 and bottom transducer arm 147. The entire bottom transducer arm 147 and everything mounted thereon can be pivoted out of the way when the upper shroud scanner 89 is being lowered into position or removed.

During use of the upper shroud scanner 89, the top of the reactor containment vessel 13 is removed and the top of the reactor pressure vessel 19 is also removed. From the top of the reactor containment vessel 13, the upper shroud scanner 89 is lowered into position with the vertical arm 115 being between the reactor pressure vessel 19 and core shroud 83. After the upper shroud scanner 89 is secured in position on the steam dam 87 by clamps 95 and 97, the Y-car 103 may be positioned along the outside flange 91 by turning gear 109 which meshes with gear rack 107. This permits the Y-car 103 along with vertical arm 115 to move around an approximately 30° arc formed by outside flange 91 and inside flange 93.

As the Y-car 103 moves around by the turning of the gear 109 and gear rack 107, upper transducer 127 monitors the top surface 157 of the core shroud 83, which in turn monitors the area above upper weld 121. At the same time, upper moveable transducer 131 monitors the area below upper weld 121 in the core shroud 83. Simultaneously, lower moveable transducer 135 monitors the area just above middle weld 123 of the core shroud 83.

Assuming the bottom transducer arm 147 is in the position as shown in FIGS. 4 and 5, upper bottom transducer 149 will monitor the area between middle weld 123 and lower weld 125. Lower bottom transducer 151 will monitor the area below lower weld 125.

By moving the upper shroud scanner 89 back and forth along the arc formed by outside flange 91 and gear rack 107, if there are any flaws in that arcuate portion of the core shroud 83, they can be discovered.

To move the upper shroud scanner 89 to a different arcuic section of the core shroud 83, the clamps 95 and 97 are released by air cylinders 99 and 101, respectively. Immediately prior to the release of the clamps 95 and 97, the lug clamp 159 is secured between one of the lug pairs 161 shown in FIGS. 3 and 5. By knowing which of the lug pairs 161 the lug clamp 159 is between, the operator will know exactly where the upper shroud scanner 89 is located.

With the lug clamp 159 securely in place between one of the lug pairs 161, and the clamps 95 and 97 loosened from the steam dam 87, now if the gear 109 is turned while meshed with gear rack 107, the outside flange 91 and inside flange 93 will move arcuicly around steam dam 87 until the Y-car 103 reaches one end of the gear rack 107. At that point, the clamps 95 and 97 are re-secured to the steam dam 87. Thereafter, the lug clamp 159 is disconnected from one of the lug pairs 161 so that now when motor 105 turns gear 109 meshed with gear rack 107, the Y-car 103 along with its vertical arm 115 all move along the gear rack 107. Now another arcuic section of the core shroud 83 may be inspected.

By the above described process of clamping and unclamping clamps 95 and 97 and lug clamps 159, different arcuic sections of the core shroud 83 may be inspected.

Because the area at the top of the reactor containment vessel 13 is at a premium when the reactor is shut down, the operator of the core shroud scanner 89 will only need to use a small area at a time. In that manner, there is less likelihood that the operation of the upper shroud scanner 89 will interfere with any other activities occurring while the unit of the nuclear power plant 11 is shut down.

Figure 6:
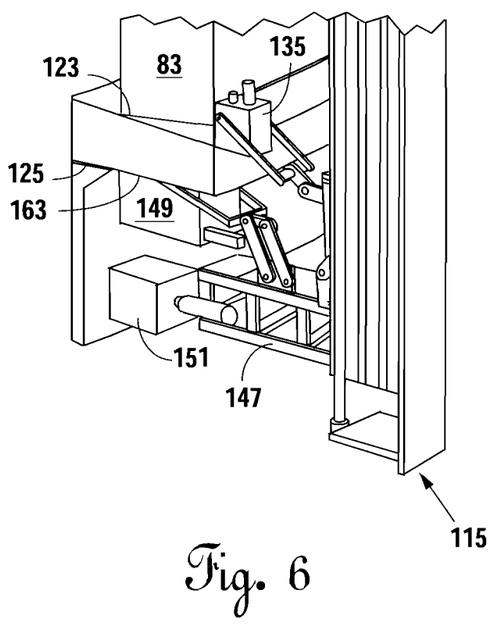
FIG. 6 is a side pictorial view illustrating inspection of the lower welds, but a transducer is mounted on the bottom transducer arm.

Referring to FIG. 6, more detail concerning the lower portion of the vertical arm 115 is shown. The middle weld 123 and lower weld 125 of the core shroud 83 is shown in further detail. As can be seen, the lower, moveable transducer 135 is inspecting near or above the middle weld 123. The upper bottom transducer 149 is checking below middle weld 123 and above lower weld 125. Lower bottom transducer 151 is checking below bottom weld 125. The entire bottom transducer arm 147 may be pivoted on pivot pin 153 (see FIG. 4) to get around the bottom lip 163 of the core shroud 83. This has to occur when the upper shroud scanner 89 is being inserted between the reactor pressure vessel 19 and the core shroud 83, or removed therefrom.

Using the process just described, the upper welds of the core shroud 83 can be inspected by using very little of the area at the top of the reactor containment vessel 13. The entire vertical arm 115 can be removed when the Y-car 103 moves behind some of the down corners 85 as shown in FIG. 2. Also, FIG. 2 illustrated therein various inlet nozzles 165 or outlet nozzles 167, which have to be worked around.

While the transducers 127, 131, 135, 149 and 151 may be of any particular type, ultrasonic transducers have been found to be particularly good for this type of inspection.

The entire upper shroud, not just the welds 121, 123 and 125, can be inspected by appropriate movement of the upper moveable transducer 131 or lower moveable transducer 135. The upper lead nut 169 causes upper movable transducer 131 to move up and down on upper lead screw 129 as it is turned by transducer motor 137 via pulley 139 and belt 141 (see FIG. 4). Likewise, lower moveable transducer 135 may be moved up and down by lower lead nut 171 on lower lead screw 133 as it is turned by transducer motor 137. In that manner, by adjusting upper moveable transducer 131 or lower moveable transducer 135 up and/or down and by back and forth movement of the Y-car 103, the complete surface of the upper portion of the core shroud 83 can be inspected and a picture painted of its physical condition. Any flaws or defects would be detected.

What I claim is:

1. An apparatus removeably attachable to a steam dam of a core shroud of a nuclear power plant for inspecting an upper section of the core shroud for flaws or defects therein, said core shroud having lug pairs around its outer surface and being located within a reactor pressure vessel, the apparatus being operable from above the core shroud and comprising:

a pair of flanges consisting of an outside flange and an inside flange, said pair of flanges forming an arc of approximately 30° on either side of the steam dam;

a pair of flange clamps for securing the distal ends of the pair of flanges to the steam dam;

a gear rack attached to the outside flange;

a Y-car having a Y-car motor with a gear that meshes with the gear rack;

a lug clamp on said Y-car to clamp said Y-car in between the lugs of one of the lug pairs;

the Y-car being moveable back and forth along the arc formed by the pair of flanges by (a) securing the pair of flange clamps to the steam dam, (b) releasing the lug clamp from the lug pair, and (c) actuating the Y-car motor to move the Y-car via the gear meshing with the gear rack;

the pair of flanges being moveable to a neighboring arcuate segment of the core shroud by (d) moving the lug clamp to a neighboring one of the lug pairs and securing it thereto, (e) releasing the pair of flange clamps from the steam dam, and (f) actuating the Y-car motor to move the pair of flanges and the gear rack via the gear meshing with the gear rack;

an upper transducer mounted on the Y-car adjacent to the outer surface of the core shroud;

a vertical arm extending downwardly from the Y-car into a space between the reactor pressure vessel and the core shroud;

the Y-car having a pivot arm base extending radially outwardly therefrom, said vertical arm being pivotally attached to said arm base;

a plurality of transducers being mounted on said vertical arm, including at least an upper moveable transducer and a lower moveable transducer, the upper moveable transducer being threadably attached to an upper lead screw and the lower moveable transducer being threadably attached to a lower lead screw, the upper and lower lead screws independently allowing up and down movement of their respective upper and lower moveable transducers along said vertical arm, said up and down movement provided by a shared transducer motor;

said plurality of transducers capable to simultaneously inspect axially spaced apart sections of the outer surface of the core shroud;

a bottom transducer arm pivotally attached to a bottom of the vertical arm by a pivot pin, at least one lower transducer being mounted on said bottom transducer arm;

the bottom transducer arm pivotal to a position adjacent the outer surface, but under a lower lip of, the core shroud by actuation of an air cylinder during insertion or removal of the apparatus;

said air cylinder connected between a radially extending portion of a roller bracket and the bottom transducer arm, said roller bracket having a roller that sets the distance between the vertical arm and the outer surface of the core shroud.

* * * * *